(12) United States Patent
Salgues et al.

(10) Patent No.: US 11,542,008 B2
(45) Date of Patent: Jan. 3, 2023

(54) AIRCRAFT COMPRISING TOILETS DESIGNED TO CONTAIN THE EFFECTS OF A MALICIOUS DEVICE

(71) Applicant: Airbus SAS, Blagnac (FR)

(72) Inventors: Benoit Salgues, Blagnac (FR); Thierry Leger, Blagnac (FR)

(73) Assignee: AIRBUS SAS, Blagnac (FR)

( * ) Notice: Subject to any disclaimer, the term of this patent is extended or adjusted under 35 U.S.C. 154(b) by 0 days.

(21) Appl. No.: 17/412,405

(22) Filed: Aug. 26, 2021

(65) Prior Publication Data
US 2022/0063810 A1   Mar. 3, 2022

(30) Foreign Application Priority Data

Sep. 1, 2020 (FR) ........................... 2008875

(51) Int. Cl.
*B64D 11/02* (2006.01)
*B64D 45/00* (2006.01)

(52) U.S. Cl.
CPC .......... *B64D 11/02* (2013.01); *B64D 45/0028* (2019.08); *B64D 45/0042* (2019.08); *B64D 45/0061* (2019.08)

(58) Field of Classification Search
CPC ................ B64D 11/02; B64D 45/0061; B64D 45/0042; B64D 45/0028
See application file for complete search history.

(56) References Cited

U.S. PATENT DOCUMENTS

| | | | | |
|---|---|---|---|---|
| 5,267,665 A | * | 12/1993 | Sanai | F42B 39/14 220/88.1 |
| 5,369,811 A | * | 12/1994 | Serre | E03F 1/006 4/431 |
| 2005/0230550 A1 | | 10/2005 | Dominguez | |
| 2008/0308676 A1 | | 12/2008 | Muller | |
| 2010/0059625 A1 | | 3/2010 | Saint-Jalmes et al. | |
| 2014/0349561 A1 | * | 11/2014 | Reiss | B60H 1/00021 454/284 |
| 2017/0296687 A1 | | 10/2017 | Hatta et al. | |
| 2020/0130842 A1 | | 4/2020 | Young et al. | |

FOREIGN PATENT DOCUMENTS

| | | |
|---|---|---|
| EP | 0555984 A1 | 8/1993 |
| EP | 3643612 A1 | 4/2020 |
| FR | 2910436 A1 | 6/2008 |
| WO | 9306430 A1 | 4/1993 |
| WO | 2005116574 A1 | 12/2005 |
| WO | 2007031321 A1 | 3/2007 |
| WO | 2013120764 A1 | 8/2013 |

OTHER PUBLICATIONS

French Search Report; priority document.

* cited by examiner

*Primary Examiner* — Justin M Benedik
(74) *Attorney, Agent, or Firm* — Greer, Burns & Crain, Ltd.

(57) ABSTRACT

An aircraft includes comprises toilet that includes a protection device configured to contain effects of a malicious device, in order to protect both a fuselage of the aircraft and passengers of the aircraft against the effects of the malicious device.

6 Claims, 3 Drawing Sheets ure with one or more of FIG. 1 is a view of an aircraft in accordance with one

AIRCRAFT COMPRISING TOILETS DESIGNED TO CONTAIN THE EFFECTS OF A MALICIOUS DEVICE

CROSS-REFERENCES TO RELATED APPLICATIONS

This application claims the benefit of the French patent application No. 2008875 filed on Sep. 1, 2020, the entire disclosures of which are incorporated herein by way of reference.

FIELD OF THE INVENTION

The invention relates to the field of the protection of aircraft against malicious acts.

BACKGROUND OF THE INVENTION

In the past, aircraft have been subjected to attacks by persons of malicious intent, in particular, by means of explosives. These attacks, depending on the circumstances, have resulted in injury to passengers or even, in the most serious cases, damage to the fuselage of the aircraft leading to destruction of the aircraft and endangering all the passengers. The crew members of an aircraft are trained to react to an attack by a person of malicious intent seeking to detonate an explosive device in the aircraft. However, the procedures in force are complex to implement and there is a need for a device that makes the task of the crew members easier in such a situation. There is also a need for a device that makes the task of the crew members easier in the event of a person of malicious intent preparing a chemical or bacteriological attack.

SUMMARY OF THE INVENTION

The present invention aims, in particular, to provide a solution to this problem. It relates to an aircraft comprising toilet that is characterized in that the toilet comprise a protection device configured to contain the effects of a malicious device, in order to protect both a fuselage of the aircraft and passengers of the aircraft against the effects of the malicious device.

Thus, the crew members who are in the presence of a person of malicious intent seeking to detonate an explosive device in the aircraft can place this explosive device in the toilet of the aircraft. In this way, if the explosive device explodes, the explosion thereof is contained in the toilet, and this makes it possible to prevent damage to the fuselage of the aircraft and injury to the passengers or crew members. In the same way, a malicious device of the chemical or bacteriological type can be placed in the toilet in such a way that there is no risk of a toxic substance coming from the malicious device reaching the passengers or crew members.

In a first embodiment, the protection device corresponds to shielding configured to contain the effects of an explosion of the malicious device, the malicious device being an explosive device.

Advantageously, the shielding is disposed on all the walls of the toilet.

Again advantageously, the toilet comprising a door, the aircraft comprises shielding disposed on a structural element of the aircraft that is placed opposite the door.

Again advantageously, the aircraft comprises a damping material disposed between a wall of the toilet and a structural element of the aircraft.

In particular, the shielding corresponds to the combination of a material that is resistant to the impact of projectiles and a material that damps the impact of projectiles.

In a second embodiment, the protection device is configured to evacuate to outside the aircraft a toxic substance coming from the malicious device, the malicious device being a chemical or bacteriological attack device.

Advantageously, the protection device comprises an air evacuation duct equipped with a shut-off system designed to be opened in the event of detection of a chemical or bacteriological attack.

Again advantageously, the protection device comprises a processing unit connected to a toxic substance sensor, the processing unit being configured to command the opening of the shut-off system in the event that the sensor provides information corresponding to the presence of a toxic substance.

In particular, the processing unit is configured to command the locking of a door of the toilet in the event that the sensor provides information corresponding to the presence of a toxic substance.

BRIEF DESCRIPTION OF THE DRAWINGS

The invention will be better understood upon reading the following description and studying the appended figures.

DETAILED DESCRIPTION OF THE PREFERRED EMBODIMENTS

Figure 1:
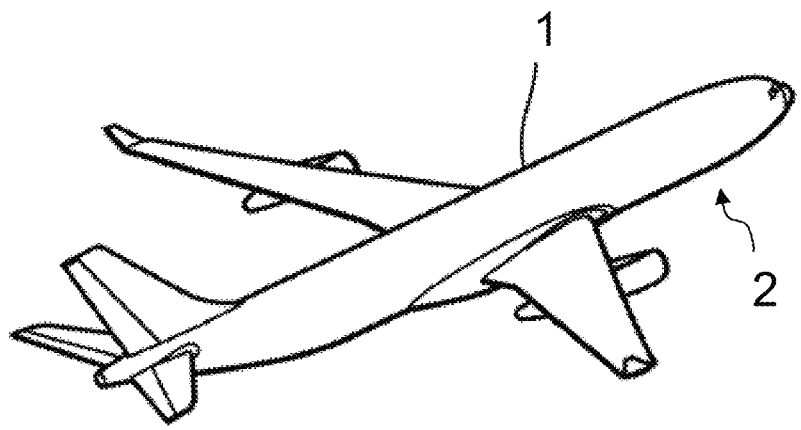
FIG. 1 is a view of an aircraft in accordance with one embodiment of the invention.
Figure 2:
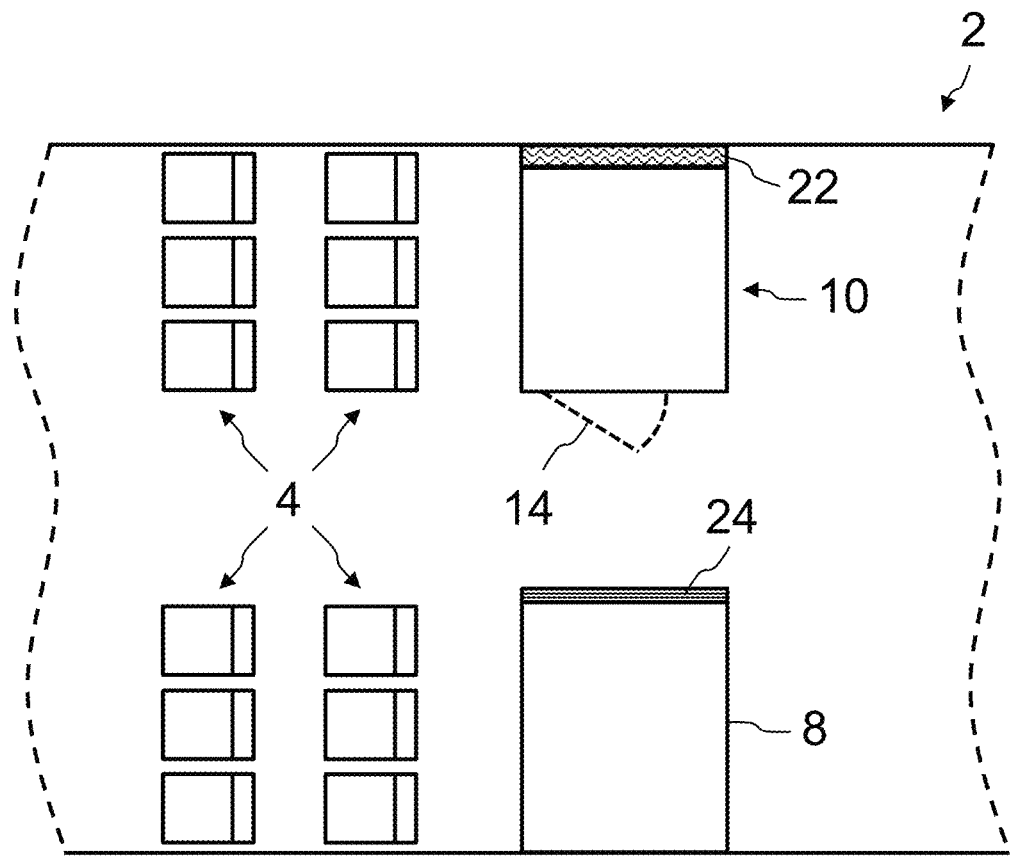
FIG. 2 schematically illustrates a part of the fuselage of the aircraft in FIG. 1, comprising a toilet.

The aircraft 1 shown in FIG. 1 has a fuselage 2. As illustrated in FIG. 2, the fuselage has one or more toilets 10 and a set of passenger seats 4. The toilet, 10 is, for example, situated in a rear part of the passenger cabin, behind the seats 4. The toilet comprises, for example, a bowl 16 and a washbasin 18 as are illustrated in FIGS. 3 to 5.

Figure 3:
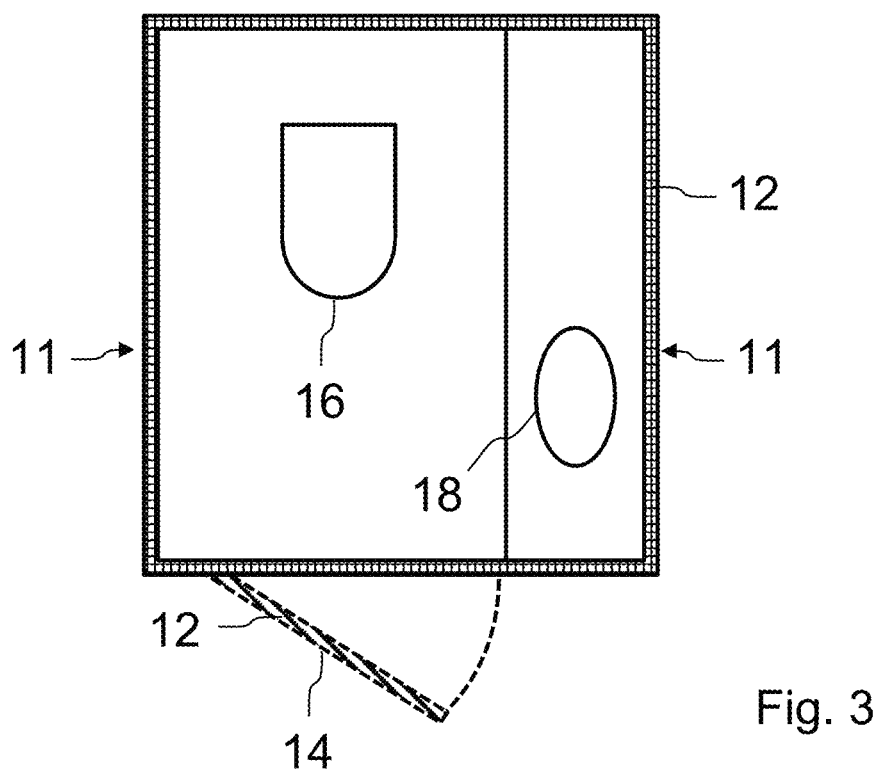
FIG. 3 schematically illustrates, in a view from above, the toilet in FIG. 2, in a first embodiment of the invention.
Figure 4:
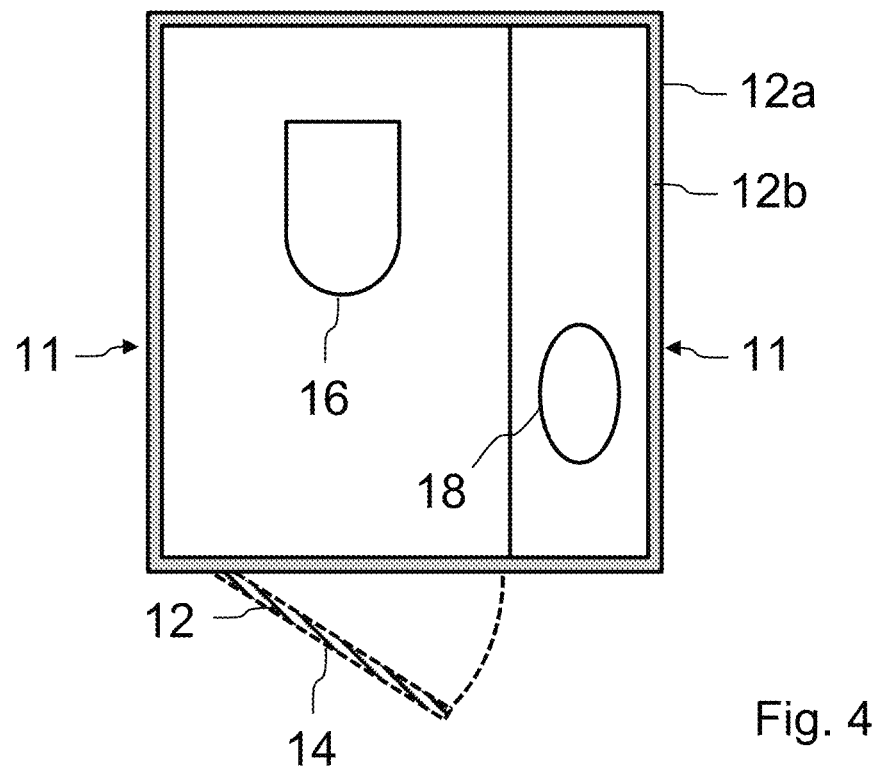
FIG. 4 schematically illustrates, in a view from above, the toilet in FIG. 2, in a first embodiment of the invention.
Figure 5:
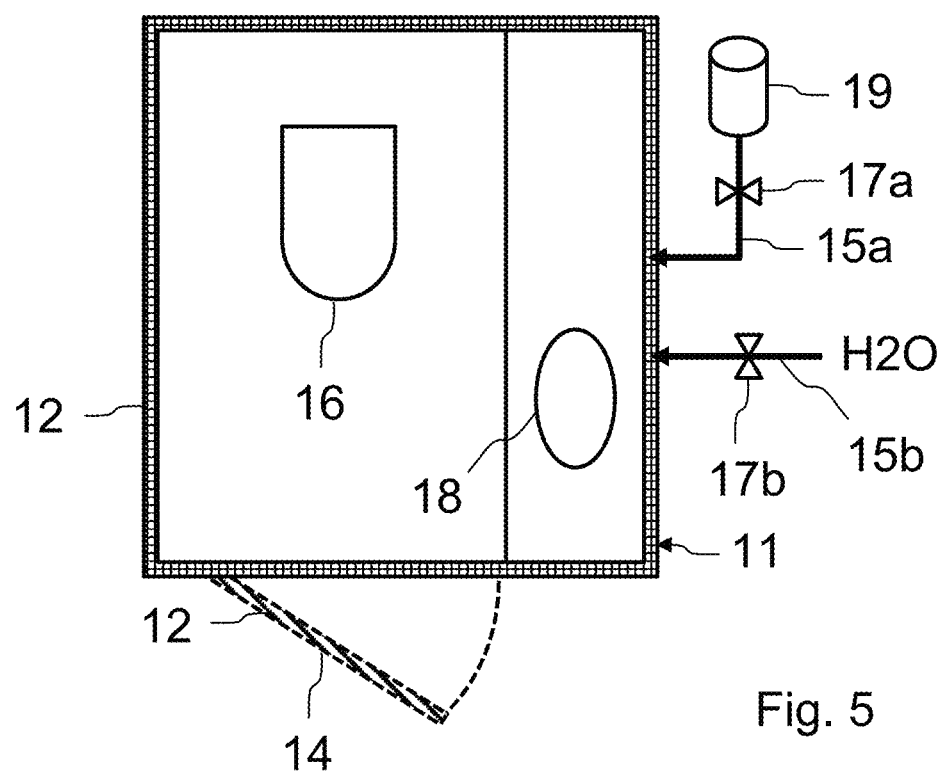
FIG. 5 schematically illustrates, in a view from above, the toilet in FIG. 2, in a first embodiment of the invention.

In a first embodiment illustrated in FIGS. 3 to 5, the toilet 10 is configured to contain the effects of a malicious device corresponding to an explosive device. Thus, in the event that a crew member is confronted with a suspicious device that he or she considers to correspond to an explosive device, he or she can place this suspicious device inside the toilet 10 and close the door 14 again. The toilet 10 comprises shielding 12 of all the walls 11 thereof. These walls 11 comprise a set of partitions (which are generally substantially vertical when the aircraft is on the ground), and a floor and a ceiling of the toilet 10. The toilet 10 has a door 14 that preferably also comprises shielding 12. Advantageously, as illustrated in FIG. 4, the shielding 12 comprises ballistic shielding 12a and damping shielding 12b. The ballistic shielding comprises a material that is resistant to the impact of projectiles, such as a layer of aramid fibers (for example, of the Kevlar® type) or a layer of polyethylene. The damping shielding comprises a material that damps the impact of projectiles, such as a layer of damping foam, corresponding, for example, to a rigid or semi-rigid foam. The damping shielding 12b is situated on the inside of the toilet relative to the ballistic shielding 12a. Thus, in the event of an explosion inside the toilet, the damping shielding 12b attenuates the shockwave coming from the explosion and the ballistic shielding 12a stops material that is thrown out by the explosion (for example, pieces of metal) in order to contain the thrown material inside the toilet.

Advantageously, as illustrated in FIG. 2, the aircraft comprises a damping material 22 disposed between the toilet 10 and a structural element of the aircraft that is situated close to the toilet. In the example illustrated in the figure, the structural element corresponds to a wall of the fuselage 2. However, without departing from the scope of the invention, the structural element can also correspond to an inner partition of the fuselage, to the floor of the passenger cabin, etc. In the event of an explosion inside the toilet 10, the presence of the damping material 22 makes it possible to limit the propagation, towards the fuselage 2 of the aircraft, of a shockwave due to the explosion.

Again advantageously, the aircraft comprises shielding 24 disposed on a structural element 8 of the aircraft that is placed opposite the door 14 to the toilet. Thus, if the door 14 opens under the effect of an explosion inside the toilet 10, this shielding 24 makes it possible to limit the effects of the shockwave inside the fuselage 2 and to stop projectiles coming from the explosion without risk of them reaching the sensitive parts of the aircraft. Without limitation, the structural element 8 corresponds, for example, to a kitchen (galley) element of the aircraft.

In particular, as illustrated in FIG. 5, the aircraft also comprises a pipe for the intake of a fluid towards at least one of the walls 11 of the toilet, and a valve mounted in series on this pipe. In the event of a risk of explosion in the toilet, for example after having placed a suspicious object therein, a crew member can command the opening of the valve. In a first variant, the fluid corresponds to water brought by a pipe 15b on which a valve 17b is mounted in series. The pipe 15b opens into a porous (or absorbent) structure of the wall 11 or of the shielding 12 associated with this wall. Thus, when the valve 17b is open, this porous (or absorbent) structure fills with water, and this makes it possible to limit the exothermic effects of the explosion on the wall 11 of the toilet and consequently on the surroundings thereof in the fuselage, in so far as the water absorbs some of the heat coming from the explosion. In a second variant, the fluid corresponds to a chemical product contained in a tank 19 and brought by a pipe 15a on which a valve 17a is mounted in series. The chemical product is chosen from among chemical products having high heat absorption properties. The pipe 15a opens into a porous (or absorbent) structure of the wall 11 or of the shielding 12 associated with this wall. Thus, when the valve 17b is open, this porous (or absorbent) structure fills with the chemical product, and this makes it possible to limit the exothermic effects of the explosion on the wall 11 of the toilet and consequently on the surroundings thereof in the fuselage, in so far as the chemical product absorbs some of the heat coming from the explosion.

Figure 6:
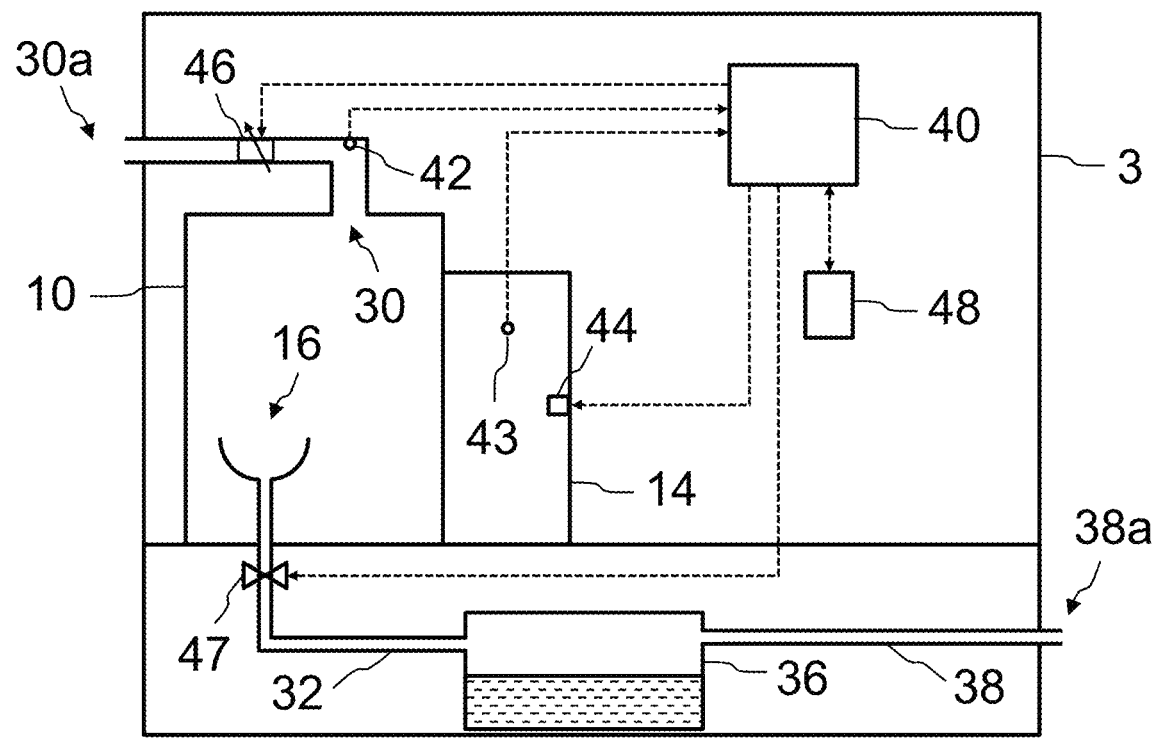
FIG. 6 schematically illustrates the toilet in FIG. 2, in a second embodiment of the invention.

In a second embodiment illustrated in FIG. 6, the toilet 10 is designed to contain the effects of a malicious device corresponding to a chemical or bacteriological attack device.

In a first variant of the second embodiment of the invention, the aircraft comprises a duct 30, a first end of which is connected to the toilet 10, for example to the ceiling as illustrated in the figure, and a second end 30a of which opens outside the aircraft. A shut-off system, corresponding to a controllable flow limiter 46, is installed in series on the duct 30.

The aircraft also comprises a processing unit 40 designed to control the flow limiter 46. The processing unit 40 comprises, for example, a microprocessor or a microcontroller. The aircraft also comprises a human-machine interface 48 connected to the processing unit 40.

In the event that a crew member is confronted with a suspicious device that he or she considers to correspond to a chemical attack device, he or she can place this suspicious device inside the toilet 10 and close the door 14 again. By means of the human-machine interface 48, the crew member signals the presence of the suspicious device inside the toilet to the processing unit 40. The processing unit 40 then commands the opening of the flow limiter 46, which was previously in a normal use position corresponding to a normal flow rate of air for the ventilation of the toilet. The opening of the flow limiter 46 makes it possible to increase the flow rate of air in the duct 30. Given that the duct 30 opens outside the fuselage of the aircraft and that the inside of the fuselage is pressurized, the duct 30 makes it possible to create a means for evacuating air from the toilet 10 towards the outside of the fuselage. Thus, if the suspicious device gives off a toxic substance in the toilet, for example a substance that is liable to present a chemical or bacteriological risk, the increase in the flow rate of air in the duct 30 allows this substance to be evacuated more easily towards the outside of the fuselage through the duct 30. This makes it possible to maintain the safety of the passengers and crew members who are present in the fuselage.

Advantageously, the aircraft also comprises at least one toxic substance sensor, for example for a chemical or bacteriological substance. In a first example, this sensor corresponds to a sensor 42 disposed on the ceiling of the toilet or close to the end of the duct 30 that is connected to the toilet. In a second example, this sensor corresponds to a sensor 43 disposed on a partition of the toilet or on the door 14. The sensor is connected to an input of the processing unit 40. In the event that the processing unit receives from the sensor 42 or 43 information corresponding to the detection of a toxic substance, it commands the opening of the flow limiter 46, and this makes it possible to create a means for evacuating air from the toilet 10 towards the outside of the fuselage. Consequently, this makes it possible to evacuate the toxic substance to outside the aircraft, without the intervention of a crew member. This is particularly advantageous in the event that a person of malicious intent isolates himself or herself in the toilet so as to prepare such a toxic substance with a view to committing a malicious act in the fuselage. Preferably, in the event that it receives information that a toxic substance has been detected by the sensor 42 or 43, the processing unit 40 also commands the locking of a lock 44 of the door 14 so as to prevent the person of malicious intent from leaving the toilet to commit a malicious act in the passenger cabin. Advantageously, the processing unit 40 also commands the activation of a sound and/or visual alert on the human-machine interface 48 so as to warn a crew member.

In a conventional manner, the bowl 16 of the toilet 10 is connected to a waste water tank 36 by a pipe 32. The waste water tank 36 is connected to a pipe 38 of which one end 38a opens outside the aircraft. A valve 47 is disposed in series on the pipe 32. The valve 47 is a valve used in a conventional manner to allow the evacuation of the content of the bowl 16 towards the waste water tank 36. To this end, the opening of the valve 47 is commanded by a user pressing a button for evacuation of the bowl. In accordance with a second variant of the second embodiment of the invention, the valve 47 is also able to be controlled by the processing unit 40. In the event that the processing unit receives from the sensor 42 or 43 information corresponding to the detection of a toxic substance, for example a chemical or bacteriological substance, it commands the opening of the valve 47, and this makes it possible to create a means for evacuating air from the toilet 10 towards the outside of the fuselage through the pipes 32 and 38, via the waste water tank 36. Consequently, this makes it possible to evacuate the toxic substance to outside the aircraft.

The first variant and the second variant of the second embodiment each make it possible to evacuate a toxic substance towards the outside of the aircraft in the event that such a substance is present in the toilet. Each of the two variants can be implemented separately. However, the two variants can be combined, and this makes it possible to increase the evacuation flow rate of air from the toilet towards the outside of the aircraft.

Advantageously, the first embodiment and the second embodiment can be combined with one another in such a way that the toilet 10 make it possible to simultaneously contain the effects of a malicious device of the explosive type and of a malicious device of the chemical or bacteriological type. The duct 30 and/or the pipe 38 then also make it possible to evacuate fumes that could come from an explosion towards the outside of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising toilet that comprise a protection device configured to contain effects of a malicious device, to protect both a fuselage of the aircraft and passengers of the aircraft against said effects of the malicious device, wherein:
the protection device is configured to evacuate to outside the aircraft a toxic substance coming from the malicious device, the malicious device being a chemical or bacteriological attack device;
the protection device comprises an air evacuation duct equipped with a shut-off system configured to be opened in an event of detection of a chemical or bacteriological attack;
the aircraft comprising a toxic substance sensor, the protection device comprises a processing unit connected to the toxic substance sensor, the processing unit being configured to command the opening of the shut-off system in the event that the sensor provides information corresponding to a presence of a toxic substance; and
the processing unit is configured to command the locking of a door of the toilet in an event that the sensor provides information corresponding to the presence of a toxic substance.

2. The aircraft according to claim 1, wherein the protection device also comprises shielding configured to contain effects of an explosion of the malicious device, the malicious device being an explosive device.

3. The aircraft according to claim 2, wherein the shielding is disposed on all walls of the toilet.

4. The aircraft according to claim 2, wherein, the toilet comprising a door, the aircraft comprises shielding disposed on a structural element of the aircraft that is placed opposite said door.

5. The aircraft according to claim 2, wherein the aircraft comprises a damping material disposed between a wall of the toilet and a structural element of the aircraft.

6. The aircraft according to claim 2, wherein the shielding corresponds to a combination of ballistic shielding and shielding that damps an impact of projectiles.

* * * * *